United States Patent [19]

Gordon et al.

[11] Patent Number: 5,224,216
[45] Date of Patent: Jun. 29, 1993

[54] COMPUTER DISKETTE DRIVE COMMUNICATION INTERFACE

[76] Inventors: Alastair T. Gordon, 61 Dalewood Road, Toronto, Ontario, Canada, M4P 2N4; Michael H. Reichmann, 137 Blantyre Avenue, Toronto, Ontario, Canada, M1N 2R6

[21] Appl. No.: 733,169

[22] Filed: Aug. 19, 1991

Related U.S. Application Data

[63] Continuation of Ser. No. 263,833, Oct. 28, 1988.

[51] Int. Cl.⁵ .................. G06F 13/00; G11B 23/00
[52] U.S. Cl. ........................... 395/275; 360/97.01; 360/133; 360/135
[58] Field of Search .............. 360/97.01, 133, 135; 364/200 MS File, 900 MS File; 398/275

[56] References Cited

U.S. PATENT DOCUMENTS

| | | | |
|---|---|---|---|
| 3,645,540 | 2/1972 | Tanaka et al. | 274/4 |
| 3,946,156 | 3/1976 | Budrose | 179/1 |
| 4,034,164 | 7/1977 | Westmoland | 179/100.11 |
| 4,135,219 | 1/1979 | Yoshizawa et al. | 360/128 |
| 4,228,474 | 10/1980 | Neal, Jr. | 360/137 |
| 4,338,644 | 7/1982 | Staar | 360/132 |
| 4,383,285 | 5/1983 | Staar | 360/132 |
| 4,504,871 | 3/1985 | Berwick et al. | 360/31 |
| 4,581,671 | 4/1986 | Francis et al. | 360/137 |
| 4,651,312 | 3/1987 | Honma et al. | 369/10 |
| 4,734,897 | 3/1988 | Scotz | 369/2 |
| 4,796,136 | 1/1989 | Henze et al. | 360/132 |
| 4,829,500 | 5/1989 | Saunders | 369/5 |
| 4,891,727 | 1/1990 | Sato et al. | 360/137 |

FOREIGN PATENT DOCUMENTS 0266701 5/1982 European Pat. Off. .
0275657 7/1988 European Pat. Off. .

OTHER PUBLICATIONS

Patent Abstract of Japan, vol. 9, No. 133 (P-362) (1856) Jun. 8, 1985, Q JP-A-60 15888 (Cannon K.K.) Jan. 26, 1985.

*Primary Examiner*—Dale M. Shaw
*Assistant Examiner*—Christopher Shin

[57] ABSTRACT

A coupler of the present invention advantageously renders the read/write head of a diskette drive of a computer a data transfer port and preferably an input/output port suitable for connection with a peripheral device. The coupler includes a data transfer element, preferably a read/write element for transferring data by coupling with the read/write head of the diskette drive. The coupler includes a suitable arrangement for connecting the data transfer element with a peripheral device thus expanding the applications of the diskette drive. The coupler is sized for receipt in the diskette drive and preferably places the stationary data transfer element in a position relative to the read/write head of the diskette drive to allow data transfer therebetween when activated and said coupler is received in the diskette drive.

13 Claims, 5 Drawing Sheets

COMPUTER DISKETTE DRIVE COMMUNICATION INTERFACE

This is a continuation of application Ser. No. 263,833 filed Oct. 28, 1988.

BACKGROUND OF THE INVENTION

The present invention relates to the transfer of information between a computer and a peripheral device. In particular the invention relates to a new method and apparatus which renders the diskette drive of a computer an input, an output, or an input/output port whereby a communication channel is established between the personal computer and the peripheral device or peripheral devices.

Personal computers contain a number of ports through which they communicate with peripheral devices such as keyboards, printers, modems, local area networks, scanners, compact disk drives and other peripherals which are not resident within the computer itself. Unfortunately the ports provided on the computer may not be suitable or available for the peripheral for which connection is desired. If additional ports are to be added, the computer has to be partially disassembled to install an appropriate circuit board and port. This installation is often difficult and in many cases is not undertaken by the user.

There remains a need to allow an effective method and apparatus for providing a communication channel between a personal computer and an exterior peripheral.

SUMMARY OF THE INVENTION

A coupler according to the present invention is proposed which is receivable within the diskette drive of a computer and is adapted for rendering the read/write head of the diskette drive a port suitable for connection with peripheral device other than a conventional diskette. Most personal computers include at least one diskette drive and the invention recognizes that the read/write head of the diskette drive can be advantageously used as a port and preferably an input/output port. To render the system convenient to the user, the coupler is dimensioned for insertion in the diskette drive to position a means for coupling, provided on the coupler, in a manner to facilitate communication with the read/write head of the diskette drive. Data is transferred between the computer and a peripheral device via the coupler.

According to an aspect of the invention the means for coupling includes a coil read/write element which is positioned for coupling to the read/write head of the diskette drive by means of electromagnetic induction.

According to an aspect of the invention the means for coupling includes a stationary read/write element suitable for providing a capacitive coupling with the read/write head of the diskette drive.

According to a further aspect of the invention the coupler has exterior dimensions of a standard diskette and is inserted within the diskette drive in the conventional manner. Such insertion aligns the read/write element of the coupler for transferring data to and from the read/write head of the diskette drive.

The invention is also directed to the method of rendering the read/write head of a computer diskette drive an input/output port.

BRIEF DESCRIPTION OF THE DRAWINGS

The preferred embodiments of the invention are shown in the drawing wherein.

DETAILED DESCRIPTION OF THE PREFERRED EMBODIMENTS

Figure 1:
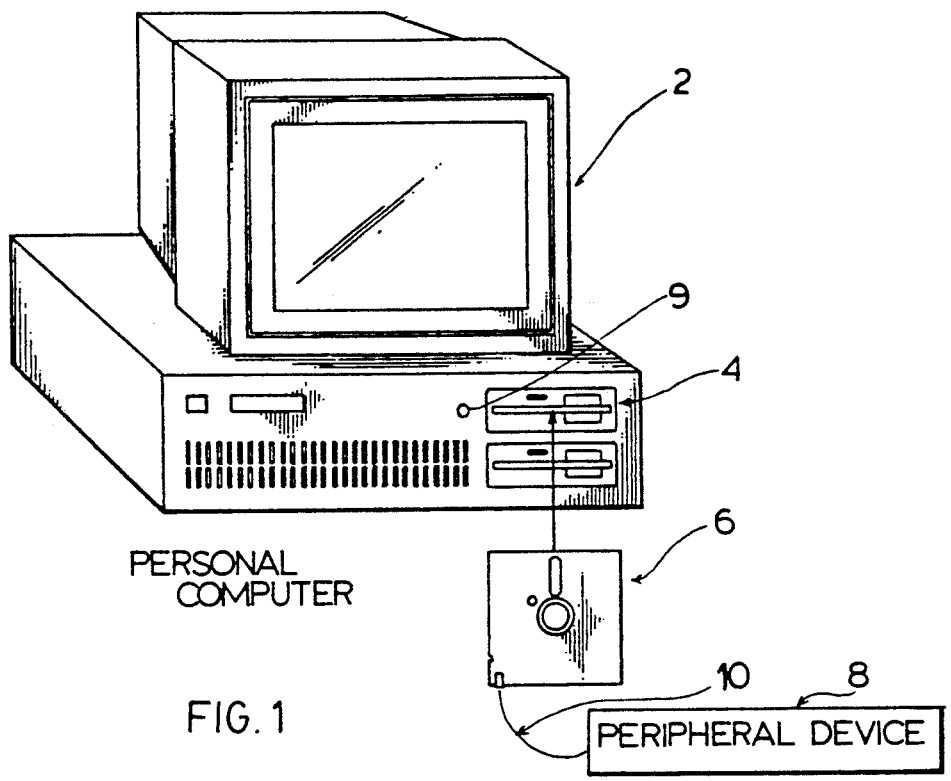
FIG. 1 is a schematic representation of the coupler in combination with a personal computer and an external peripheral device.

A personal computer 2 having a diskette drive 4 is shown in FIGS. 1 through 5 and is used in combination with the coupler 6 for connecting the external peripheral device 8 with the personal computer 2. FIG. 1 illustrates the coupler 6 having an electrical or optical connection 10 by means of which data is transmitted between the coupler 6 and the external peripheral device 8. The coupler 6 is dimensionally compatible with the removeable media diskette drive 4 which typically would receive a 5¼" diskette or a 3½" diskette or other standard diskettes. Thus the coupler 6 is inserted into the diskette drive as if it where a standard diskette to render the read/write head of the diskette drive an input/output port by means of which serial data is exchanged between the personal computer 2 and the external peripheral device 8. In some cases it will only be desirable to input or output data and thus the coupler need not necessarily render the read/write head an input/output device.

The term "peripheral device" is used broadly and includes keyboards, printers, modems, memory cartridges, local area networks, facsimile machines, scanners, compact disk drives, memory storage arrangements and other peripherals which are not resident in the computer 2 itself. The term peripheral device does not include standard diskettes intended for receipt in the diskette drive.

Figure 6:
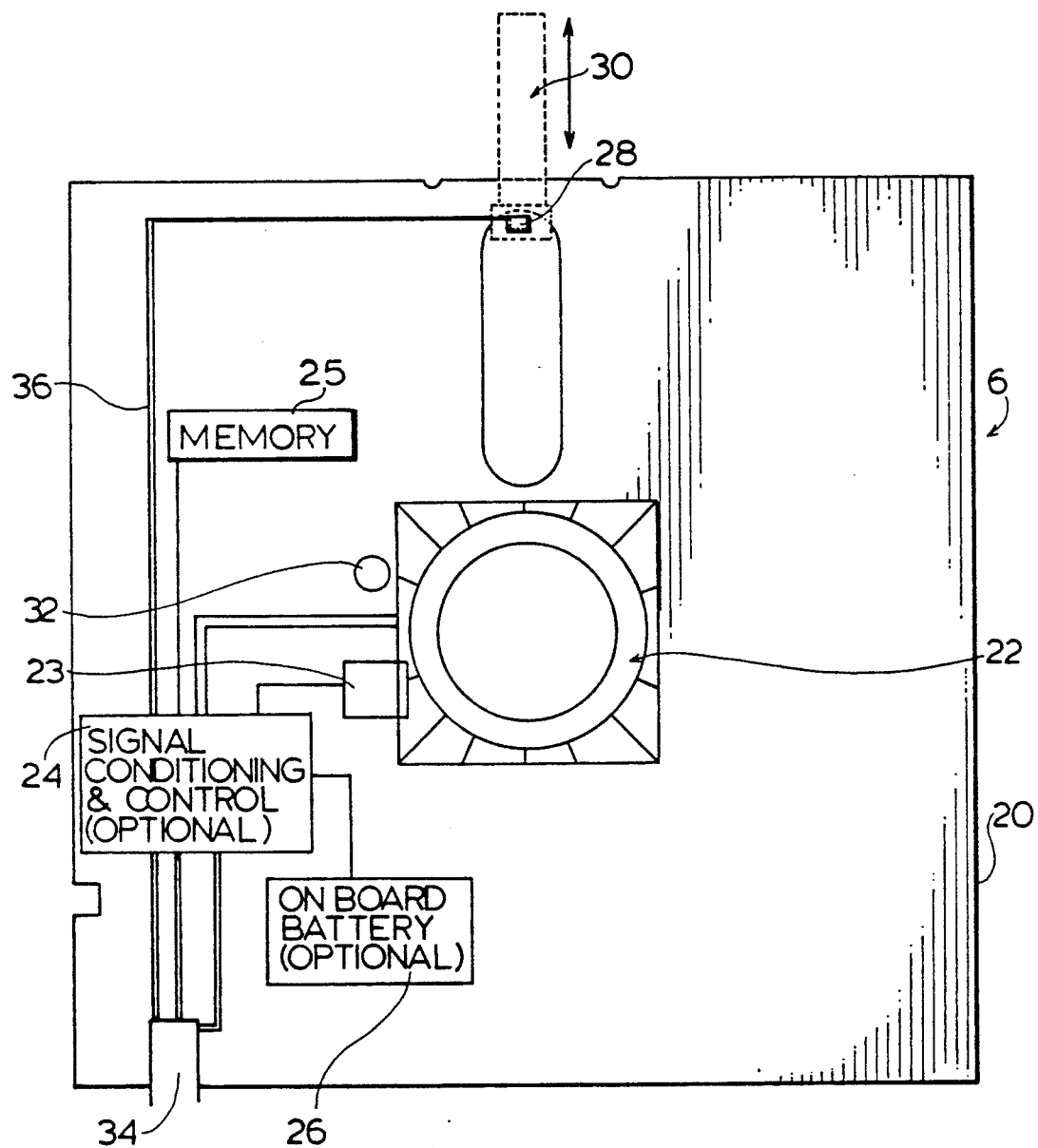
FIG. 6 is a top view of the coupler.

Details of the coupler 6 are shown in FIG. 6 in combination with a read/write head of a diskette drive. The coupler 6 in this embodiment is shown having an exterior periphery 20 corresponding to the shape of a standard 5¼" diskette to allow convenient insertion within the diskette drive. In this case the coupler 6 includes a rotating section 22 appropriately configured to create the necessary timing pulse in combination with the timing hole 32. It should be noted that this rotary section is not required in all applications, however some diskette drives require a timing pulse to be received from a spinning diskette in order to determine the number of the sector that is currently at the read/write head. This timing pulse function will be coordinated with the coupler's signal conditioning and control electronics 24 such that both the external device and the diskette controller are synchronized with respect to apparent sector positioning.

In some cases it is desirable to provide a small generator or alternator 23 which is associated with the rotating portion 22 to generate electrical energy as portion 22 is driven by the diskette drive. The power can be provided to the signal conditioning and control circuitry 24 for powering thereof or indirect powering thereof as the generator or alternator 23 powers an onboard battery. Many applications will not require the generator or alternator 23 and even the signal conditioning and control circuitry 24 can be located externally of the coupler 6. Similarly, many applications will not require the on board battery, the timing pulse or a rotating element. The signal conditioning and control circuitry has a memory 25 associated therewith and by means of which initial signals instructing the computer may be sent thereto when the coupler is initially aligned and positioned within said diskette drive.

In order to effect a coupling between the read/write head 30 found in a diskette drive and an external peripheral device, the head 30 is located at a particular track position of what would be the diskette, however in contrast to a diskette where a rotating medium would be spinning past the head, a data transfer element in this case a read/write element 28, is provided by means of which data is transferred to or received from the read/write head 30. This read/write element 28 is stationary and in the case of inductive coupling the read/write element 28 is in the form of a coil. Read/Write element 28 is connected via suitable electrical connection indicated as 36 to the signal conditioning and control circuitry indicated as 24. In many cases the electrical connection 36 will lead directly to an external peripheral device.

When information is transmitted from the external device to the computer 2 a modulated electrical current creates a magnetic field in the read/write element 28. This field causes an electrical current to be induced in the read/write head 30 of the diskette drive which is treated by the downstream electronics of the diskette drive as a stream of bits coming from a spinning diskette. When transmitting data from the computer to the peripheral device 8 the read/write element 28 on the coupler 6 is exposed to the modulated electromagnetic field from the diskette drive read/write head 30 which behaves as if it is writing to an ordinary diskette.

This field induces an electrical current in the coupler read/write element 28 which is then directed to the external device 8. Amplification and conditioning of the signal received from the read/write head 30 via the read/write element 28 can occur either on the coupler 6 or external thereto.

Figure 7:
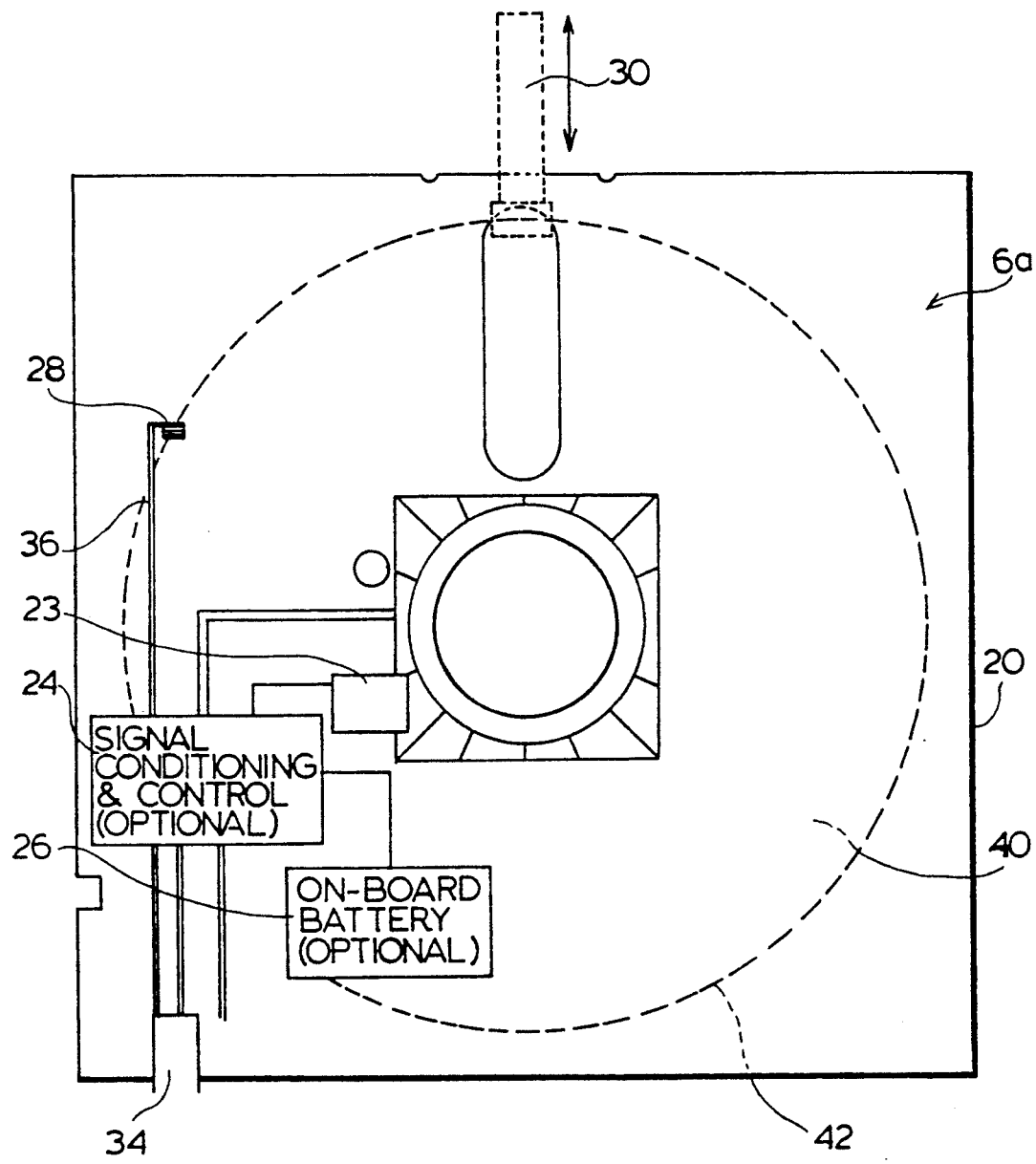
FIG. 7 is a top view of a modified coupler.

The read/write element 28 on the coupler 6 can be positioned other than directly against the read/write head 30 of the diskette drive as shown in FIG. 7. In this case a rotating diskette-like medium indicated as 40 is present and is being driven by the diskette drive. The read/write element 28 when transferring data to the computer 2 will actually write its data onto one or more tracks indicated as 42 of the spinning diskette-like medium 40 as if it were a normal diskette read/write head. When the data thus written is transported to the read/write head 30 of the diskette drive by the rotation of the diskette-like medium, the read/write head reads the data from the same one or more tracks 42 in the normal manner of reading from a diskette. When the computer is transferring data to the external device, the read/write head of the diskette will write the data onto the diskette-like medium in the normal manner and the read/write element 28 of the coupler 6 will read the data from the diskette-like medium 40 as the data is carried past the read/write element 28 by rotation of the diskette medium 40.

As previously stated the signal conditioning and control circuitry 24 need not be on the coupler 6 and need not include its own power generation or battery arrangement. For example this circuitry can be included in the external device and be powered thereby. There are advantages to providing it directly on the coupler as the external device would not be required to supply such functionality.

The coupler in FIGS. 6 and 7 includes an interface 34 to provide appropriate connection with an external peripheral device. The interface 34 can be an electrical signal for communication by conductive cable or an optical signal for communication by optical fiber.

Returning to FIG. 1 the invention will be described with respect to a typical embodiment where the external peripheral device is a hard disk drive which is connected to the computer 2 via the diskette drive already present in the computer. In such an example the user sacrifices the storage of the diskette and enjoys advantages of the hard disk which would include faster access time and greater data capacity. These advantages are achieved through an installation process which is simple, quick and foolproof and requires no special skills.

When the user first approaches the computer 2 he would if necessary remove any diskette that may be in the diskette drive which he wishes to use in coupling his hard disk drive to the computer 2. He would then insert the coupler 6 into the drive and perform the normal mechanical activation procedure following the loading of a diskette, namely the movement of a lever or the closing of a door on the diskette drive. The electrical connector 10 connects the coupler with the external hard disk drive 10.

The user would then "re-boot" his computer causing the computer 2 to enter a restart mode as if its power switch had just been turned on or the reset button had been pressed. Following a restart or reset the central processing unit (CPU) of the computer 2 is directed by a program permanently resident in read only memory of the computer to retrieve another program from a specified track and sector of the diskette drive into which the coupler is inserted.

The CPU therefore looks for a "bootstrap" program on a diskette that may be resident in the diskette drive into which the coupler is inserted. The coupler signal conditioning and control circuitry 24 would cause a stream of bits to be sent to the read/write head 30 of the diskette drive in a form that the bits appear to the diskette drive and the CPU to be a "bootstrap" program as being read from a spinning disk. In fact the "bootstrap" program is really on the external hard disk and the coupler is causing the bit pattern which constitutes that program to be induced through electromagnetic coupling into the read/write head 30 of the diskette drive. Thus the CPU "thinks" it is loading a normal "bootstrap" program into memory and once it has loaded the normal amount of data it turns control of the computer over to the "bootstrap" program. In this case however the "bootstrap" just loaded from the external hard disk undertakes the tasks necessary to configure the software and hardware of the computer to allow subsequent application programs and operating systems to use the external hard disk drive that is connected by the coupler 6 essentially as if it were a normal disk drive installed in the computer in the normal manner.

Having thus configured the computer via the special "bootstrap" program the hard disk becomes a resource available to all applications and operating systems which may be executed in the computer usable essentially as a normally installed hard disk.

In the preferred embodiment data is transferred to and from the diskette drive read/write head 30 to the read/write element 28 of the coupler through electromagnetic induction. When information is transferred from the external device to the computer a modulated electrical current creates an magnetic field in the read/write element which is in the form of a coil. This field causes an electrical current to be induced in the read/write head 30 of the diskette drive which is treated by the downstream electronics in the diskette drive as a stream of bits coming from a spinning diskette. Other arrangements are possible for forming a data transfer link with the read/write head of the diskette drive, as for example a capacitive coupling.

The peripheral device connected via the coupler 6 could be any peripheral device including printers, solid state memory, communication ports, networks, scanners, other computer instrumentation, monitors, plotters, spatial digitizers, control instruments, external audio devices including speech recognition, signal analysis, speech synthesis, sound generator, and digital audio recording/playback. The peripheral device could be a pointing device such as mouse, track ball, joy stick, or knob box. It is also noted that a series of peripherals could be attached in the manner now carried out using a single computer port.

Figure 2:
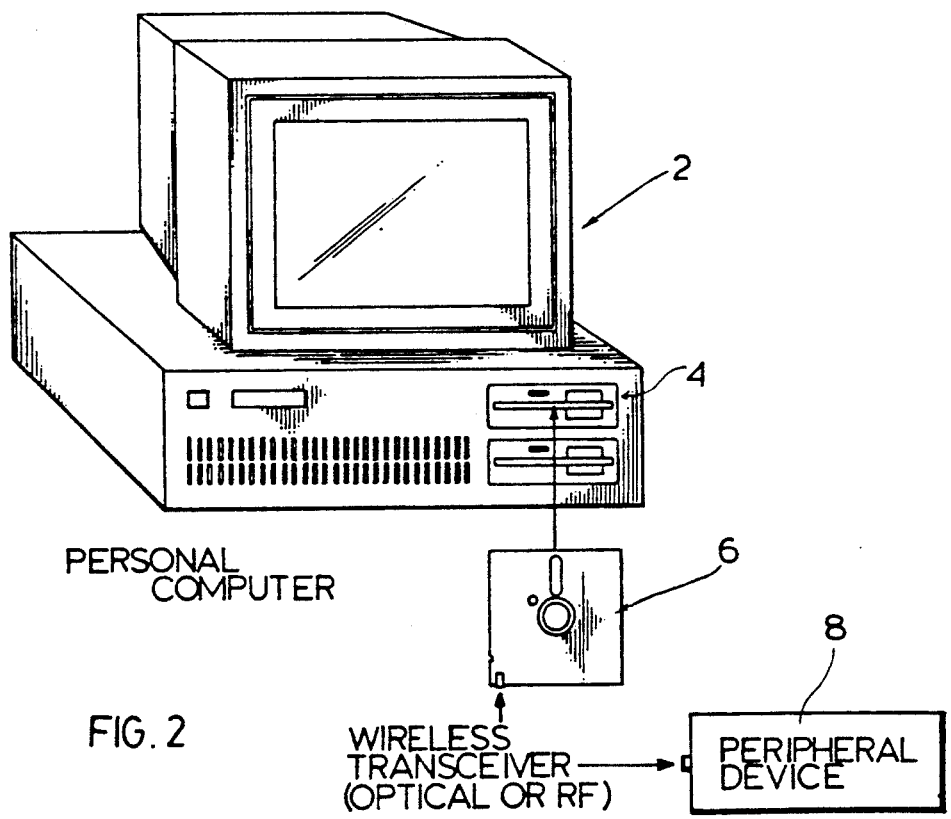
FIG. 2 is a schematic of the coupler in combination with a personal computer device and an external peripheral device where the coupler is connected to the peripheral device by a wireless transceiver.

The interface 34 could allow connection via a free air radio or optical signal as generally shown in FIG. 2 which depicts a wireless transreceiver arrangement which connects the coupler 6 with the peripheral device 8.

Figure 3:
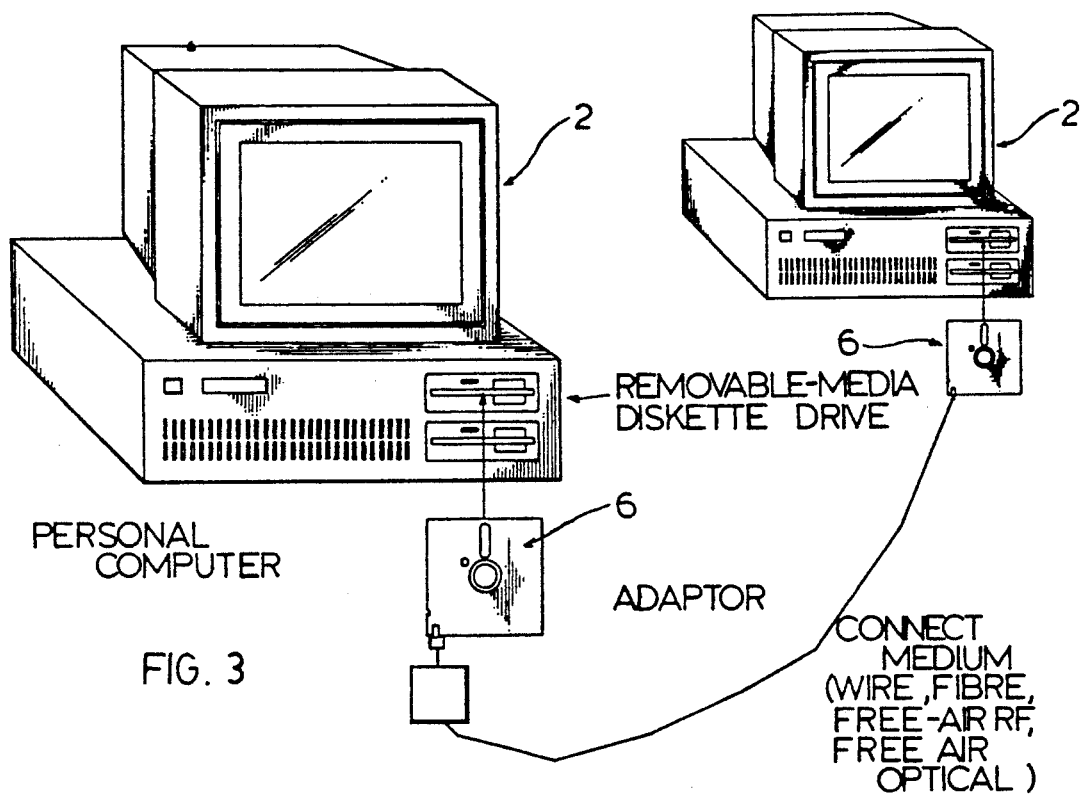
FIG. 3 is a schematic showing the personal computer and two couplers whereby information may be transferred between separate drives of separate computers.

The embodiment of FIG. 3 illustrates how two couplers 6 can be used to connect two separate personal computers 2 via the diskette drives of the personal computers.

Figure 4:
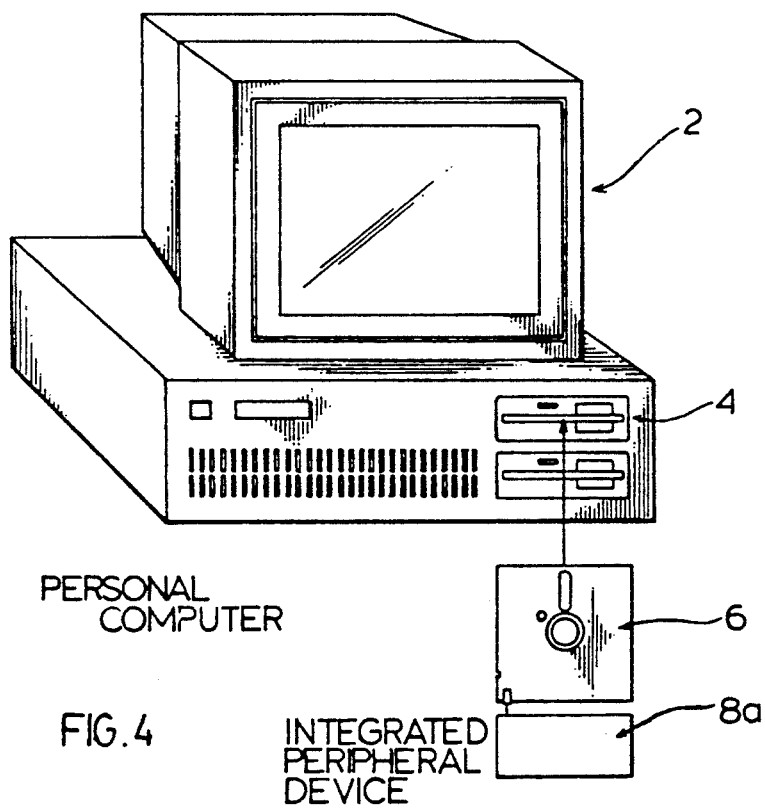
FIG. 4 is a schematic representation showing a coupler which has been integrated with an external peripheral device in combination with a personal computer.

The embodiment of FIG. 4 illustrates how the coupler 6 may be integrated with a peripheral device generally indicated as 8a. Thus the electrical connection between the coupler and the peripheral device is now completed via the integration of the coupler and the external peripheral device.

Figure 5:
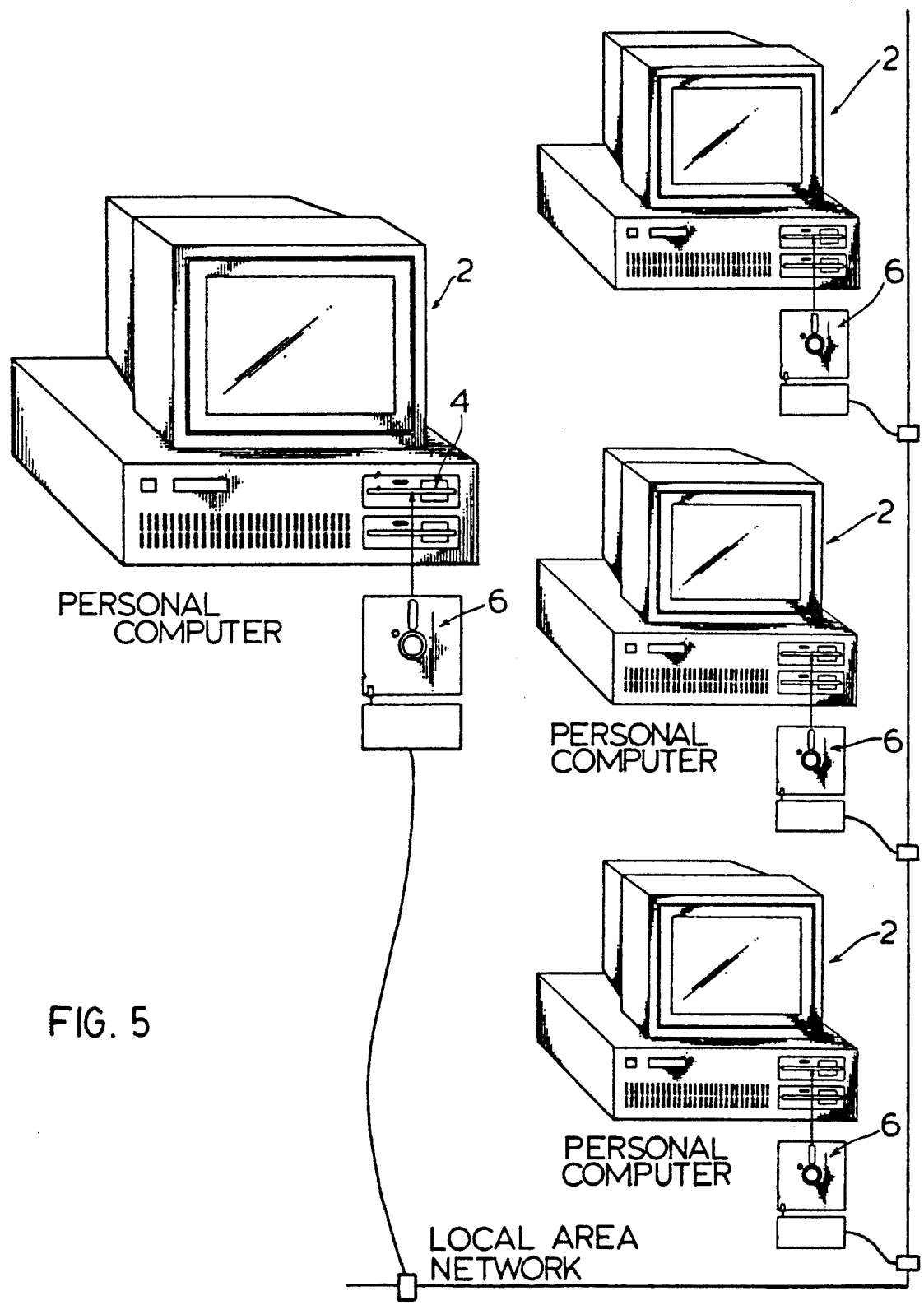
FIG. 5 is a schematic representation showing a personal computer and a coupler for coupling the personal computer with a local area network.

The embodiment of FIG. 5 illustrates how the adapter can be used for coupling a personal computer into a local area network.

All the embodiments of FIGS. 1 through 5 recognize that the coupler 6 renders the read/write head of the diskette drive an input/output port by means of which the personal computer 2 can effectively communicate with external peripheral devices in many different forms. Depending upon the particular application for which the read/write head is rendered a data transfer port, certain configurations of the coupler 6 may be preferred. The coupler may also render the read/write head of the diskette drive an input port only or an output port only.

In FIG. 1, a separate port 9 is shown which is associated with the read/write head of the diskette drive 4. This port would be provided in new computers to allow a direct connection to the circuitry within the computer associated with the read/write head. Thus, rather than forming a coupling via the read/write head the port 9 is wired to the circuitry to allow serial data to flow directly to or from a connected peripheral. Such a port could utilize the desirable characteristics of the circuitry associated with the read/write head.

Some advantages the coupler and method of the present invention may have over other ports that are present on a personal computer or which may be installed in a personal computer are as follows:

Such an interface is almost universal, since most personal computers are equipped with removable-media diskette drives. Other types of communications ports are much less universally available on all personal computers.

Installation is immediate and convenient. Most ports require the user to connect from behind the computer and may require the use of tools to remove and attach connectors. Where a suitable port does not exist and a circuit board must be installed in the personal computer to provide such functionality, then the user is forced to dismantle the computer and physically install hardware within the computer's chassis.

Installation is foolproof, since connecting to the port is a task identical to inserting a diskette into the drive, a function that any computer user is comfortable with.

This system provides a higher speed two-way channel than is typically available on personal computers.

This system offers considerable cost savings over alternate methods having comparable performance.

Although preferred embodiments of the invention have been described herein in detail it will be appreciated by those skilled in the art that variations may be made thereto without departing from the spirit of the invention or the scope of the appended claims.

The embodiments of the invention in which an exclusive property or privilege is claimed are defined as follows:

1. In combination a computer having a diskette drive, an end user computer peripheral device having an input/output port normally connectible to a conventional computer input/output port, and a coupler which couples the computer with the end user computer peripheral device without using a conventional computer input/output port: said coupler being sized and shaped for insertion within the diskette drive of the computer and accurately aligns and positions said coupler with a read/write head of the diskette drive and forms a data transfer relationship between said read/write head and a means for coupling of said coupler, said coupler further including signal transfer means connecting said coupler and said input/output port of said end user computer peripheral device, said means for coupling being connected to and forming a data transfer arrangement with said signal transfer means whereby data is transferred from said computer to said end user computer peripheral device via said read/write head of said computer, said coupler, and said input/output port of said end user computer peripheral device.

2. In combination as claimed in claim 1 wherein said means for coupling includes a coil read/write element positioned on said coupler to align with said read/write head of the diskette drive and form an electromagnetic induction connection therewith when said coupler is inserted in said diskette drive.

3. In combination as claimed in claim 1 wherein said means for coupling includes a read/write element for effecting a capacitive coupling with the read/write head of the diskette drive.

4. In combination as claimed in claim 1 wherein said means for coupling is a read/write element in a fixed position on said coupler that aligns with the read/write head of the diskette drive when said coupler is inserted in said diskette drive.

5. In combination as claimed in claim 4 including signal conditioning means which cooperates with said element to enhance a signal received by said element from the read/write head prior to passage of said signal to said signal transfer means.

6. In combination as claimed in claim 1 wherein said means for coupling with a read/write head of the diskette drive includes in combination a rotatably mounted memory storage means rotatably driven by said diskette drive and in data transfer relationship with said read/write head of said diskette drive and a coupler read/write head in data transfer relationship with said rotatably mounted memory storage means; said coupler read/write head, said read/write head of said diskette drive, and said rotatably mounted memory storage means cooperating to effect data transfer between said read/write heads via said rotatably mounted memory storage means.

7. In combination as claimed in claim 1 wherein said coupler includes memory means for producing an initial set of signal instructions for said computer which are transmitted to said computer when said coupler is initially aligned and positioned within said diskette drive.

8. In combination as claimed in claim 1 wherein said signal transfer means comprises a standard interface on said coupler by means of which said external peripheral device is connected to said coupler.

9. In combination as claimed in claim 1 wherein said one end user peripheral device is chosen from the group comprising printers, solid state memory, communication ports, networks, scanners, other computer instrumentation, monitors, plotters, spatial digitizers, control instruments, pointing device such as a mouse, track ball, joy stick, or knob box, and external audio devices including speech recognition, signal analysis, speech synthesis, sound generator, and digital audio recording/playback.

10. A method for forming a data transfer coupling between a computer having a diskette drive having a read/write head and an input/output port of one separate end user computer peripheral of a host of separate end user computer peripherals where each separate end user computer peripheral is traditionally connectable to a computer by means of an input/output port of the computer and the standard input/output port of the particular separate computer peripheral, said method comprising:

inserting a coupler having a stationary data transfer element into the diskette drive and forming a data transfer coupling between the stationary data transfer element and the read/write head of the diskette drive which coupling accommodates transmitting data between the stationary data transfer element and the read/write head, and connecting said coupler to the standard input/output port of the separate computer peripheral and thereby forming a data transfer path between the read/write head and said input/output port of the one separate computer peripheral whereby data is transferred between the computer and said one separate computer peripheral via the read/write head of the diskette drive.

11. A method as claimed in claim 10 wherein said step of inserting the coupler aligns the stationary data transfer element against the read/write head of the diskette drive.

12. A method as claimed in claim 10 wherein said step of inserting the coupler causes the coupling of the read/write head with a memory storage medium and causes the coupling of the stationary data transfer element with the memory storage medium whereby data is transferred between the stationary data transfer element and the read/write head via the memory storage medium.

13. A method as claimed in claim 11 including providing said coupler with an initial instructing signal which is activated by inserting the coupler in the diskette drive, and relaying said instructing signal to the computer via the stationary data transfer element.

* * * * *

(12) REEXAMINATION CERTIFICATE (4669th)

United States Patent
Gordon et al.

(10) Number: US 5,224,216 C1
(45) Certificate Issued: Nov. 12, 2002

(54) COMPUTER DISKETTE DRIVE COMMUNICATION INTERFACE

(75) Inventors: Alastair T. Gordon, Toronto (CA); Michael H. Reichmann, Toronto (CA)

(73) Assignee: PC Connector Solutions, LLC, Los Angeles, CA (US)

Reexamination Request:
No. 90/006,077, Aug. 6, 2001
No. 90/006,136, Oct. 31, 2001

Reexamination Certificate for:
Patent No.: 5,224,216
Issued: Jun. 29, 1993
Appl. No.: 07/733,169
Filed: Aug. 19, 1991

(21) Appl. No.: 07/733,169

Related U.S. Application Data

(63) Continuation of application No. 07/263,833, filed on Oct. 28, 1988, now abandoned.

(51) Int. Cl.[7] .......................... G06F 13/00; G11B 23/00
(52) U.S. Cl. ................ 710/2; 710/62; 710/63; 710/72; 710/64; 360/133; 360/135; 360/97.01
(58) Field of Search ............... 360/88, 97.01, 360/97.04, 99.01, 131, 133, 135; 710/1, 2, 62–64, 72–74, 100, 300, 301

(56) References Cited

U.S. PATENT DOCUMENTS

| | | | |
|---|---|---|---|
| 4,504,871 A | 3/1985 | Berwick et al. | 360/12 |
| 4,796,136 A | 1/1989 | Henze et al. | 360/132 |
| 4,814,924 A | 3/1989 | Ozeki | |
| 4,890,179 A | 12/1989 | Baker | 360/132 |

OTHER PUBLICATIONS

*Commodore 64 User's Handbook*, Commodore 64 Datassette Cassette Recorder, p. 1, 143–155, Copyright 1983.
"Service Manual Datassette Model C2N/1530/1531", Oct. 1984.
"Perfect PC Tape Backup MT25", MicroSystems International, published in "PC Week", Sep. 3, 1985.
MT25 PC Tape Backup, Advertisement "PC Week", Dec. 3, 1985.
"IBM PC Tape Backup", Microwave Inc., published in "Mini–Micro Systems", Apr. 19, 1985.
"Portable Tape Backup For PC/XT & Compatibles", published in "PC Week" Dec. 17, 1985.
"New for the Mac Plus! Small But Mighty—CIRRUS 40T, 40MB Tape Backup", Copyright 1986, Kamerman Labs.
"EVEREX Excel Streaming Tape", published in "PC Week", Aug. 12, 1986.
"Get Your Backup in Great Shape—Announcing the A–Frame 40", published in PC Week May 6, 1986.
"Every Bit of Your Work Is Worth Remembering", the MDI MT40P, published in "PC Week" May 13, 1986.

*Primary Examiner*—Jeffrey A. Gaffin

(57) ABSTRACT

A coupler of the present invention advantageously renders the read/write head of a diskette drive of a computer a data transfer port and preferably an input/output port suitable for connection with a peripheral device. The coupler includes a data transfer element, preferably a read/write element for transferring data by coupling with the read/write head of the diskette drive. The coupler includes a suitable arrangement for connecting the data transfer element with a peripheral device thus expanding the applications of the diskette drive. The coupler is sized for receipt in the diskette drive and preferably places the stationary data transfer element in a position relative to the read/write head of the diskette drive to allow data transfer therebetween when activated and said coupler is received in the diskette drive.

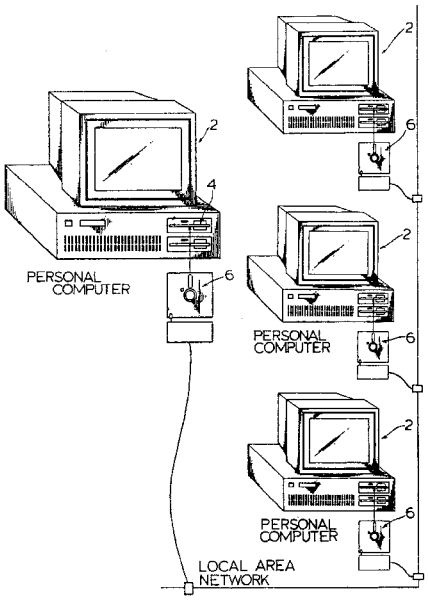

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *